US007749478B2

(12) United States Patent
Konesky

(10) Patent No.: US 7,749,478 B2
(45) Date of Patent: Jul. 6, 2010

(54) MORPHOLOGICAL CONTROL OF CARBON NANOTUBES

(76) Inventor: Gregory Konesky, 3 Rolling Hill Rd., Hampton Bays, NY (US) 11946

( * ) Notice: Subject to any disclaimer, the term of this patent is extended or adjusted under 35 U.S.C. 154(b) by 733 days.

(21) Appl. No.: 11/418,403

(22) Filed: May 4, 2006

(65) Prior Publication Data
US 2007/0114120 A1 May 24, 2007

(51) Int. Cl.
*C01B 31/02* (2006.01)
(52) U.S. Cl. .................. 423/447.2; 423/445; 423/447.1; 977/742
(58) Field of Classification Search .............. 423/447.1, 423/447.2, 447.3, 447.7, 445 B; 977/742, 977/743, 745
See application file for complete search history.

(56) References Cited

U.S. PATENT DOCUMENTS

| 4,574,345 | A | 3/1986 | Konesky | |
| 6,837,928 | B1 * | 1/2005 | Zhang et al. | 117/95 |
| 7,316,682 | B2 | 1/2008 | Konesky | |
| 2005/0170089 | A1 * | 8/2005 | Lashmore et al. | 427/248.1 |
| 2006/0275956 | A1 | 12/2006 | Konesky | |

OTHER PUBLICATIONS

Y. Avigal and R. Kalish, "Growth of Aligned Carbon Nanotubes by Biasing During Growth", Apr. 16, 2001, Applied Physics Letters, vol. 78, num. 16, pp. 2291-2293.*

L. Delzeit, I. McAninch, B. Cruden, D. Hash, B. Chen, J. Han, and M Meyyappan, "Growth of Multiwall Carbon nanotubes in an Inductively Coupled Plasma Reactor", May 1, 2002, vol. 91, num. 9, pp. 6027-6033.*
AuBuchon et al., Multiple sharp bendings of carbon nanotubes to produce zigzag morphology, 2004, Nano Letters, vol. 4, No. 9, p. 1781-1784.*
AuBuchon et al., Control of Carbon Capping for Regrowth of Aligned Carbon Nanotubes, Mar. 2005, Journal of Physical Chemistry B, vol. 109, p. 6044-6048.*
"Multiple sharp bendings of Carbon Nanotubes during growth to produce zigzag morphology" J. AuBuchon, et al. Nano Letters, vol. 4, No. 9, pp. 1781-1784, 2004.
Y. Zhang et al., Electric-field-directed growth of aligned single-walled carbon nanotubes, Applied Physics Letters, vol. 79, No. 19, pp. 3155-3157, Nov. 5, 2001.
A. Nojeh et al., Electric-field-directed growth of carbon nanotubes in two dimensions, J. Vac. Sci. Technol. B, vol. 22, No. 6, pp. 3421-3425, Nov./Dec. 2004.
J. Jiao et al., High-yield synthesis of carbon coils on tungsten substrates and their behavior in the presence of an electric field, J. Mater. Res., vol. 18, No. 11, Nov. 2003.

* cited by examiner

*Primary Examiner*—Jerry Lorengo
*Assistant Examiner*—Jared Wood
(74) *Attorney, Agent, or Firm*—Gerald E. Hespos; Michael J. Porco

(57) ABSTRACT

This disclosure relates to morphological control of carbon nanotubes, to form shapes, including, inter alia, nanosprings, nanocoils and nanohooks of desired shape, diameter, chirality and /or pitch wherein a desired morphological design may be manipulated with spatially, sequential time varying electric fields formed by electrode arrays located and activated near the CNT growth substrate. These forms may be employed in a myriad of various applications, including, micro electromechanical systems and advanced microelectronic interconnects.

10 Claims, 3 Drawing Sheets

MORPHOLOGICAL CONTROL OF CARBON NANOTUBES

RELATED APPLICATION

This application is related to U.S. patent application Ser. No. 11/144,954, which was filed on Jun. 4, 2005, and Disclosure Document 57436, which was filed on May 13, 2005.

TECHNICAL FIELD

This disclosure relates to morphological control of carbon nanotubes via the use of spatially sequential time varying field-directed synthesis.

BACKGROUND

Carbon nanotubes, like fullerenes, are comprised of shells of carbon atoms forming a network of hexagonal structures, which arrange themselves helically into a three-dimensional cylindrical shape. The helix arrangement, or helicity, is the arrangement of the carbon hexagonal rings with respect to a defined axis of a tube. Generally, the diameter of a nanotube may range from approximately 1 nanometer ("nm") to more than 100 nm. The length of a nanotube may potentially be millions of times greater than its diameter. Carbon nanotubes are chemically inert, thermally stable, highly strong, lightweight, flexible and electrically conductive, and may have greater strength than any other known material.

Common methods for the manufacturing of nanotubes include high-pressure carbon monoxide processes, pulsed laser vaporization processes and arc discharge processes. These processes produce nanotubes by depositing free carbon atoms onto a surface at high temperature and/or pressure in the presence of metal catalyst particles. The nanotubes typically form as bundles of tubes embedded in a matrix of contaminating material composed of amorphous carbon, metal catalyst particles, organic impurities and various fullerenes depending on the type of process used. Bundles of nanotubes formed by these manufacturing methods can be usually extremely difficult to separate.

Current methods for purifying and isolating nanotubes to remove contaminating matrix surrounding the tubes employ a variety of physical and chemical treatments. The treatments include high temperature acid reflux of raw material in an attempt to chemically degrade contaminating metal catalyst particles and amorphous carbon, the use of magnetic separation techniques to remove metal particles, the use of differential centrifugation for separating the nanotubes from the contaminating material, the use of physical sizing meshes (i.e., size exclusion columns) to remove contaminating material and physical disruption of the raw material utilizing sonication. Additionally, techniques have been developed to partially disperse nanotubes in organic solvents in an attempt to purify and isolate the structures. The uniformity of a matrix may also be improved by lowering the amount of nanotubes, however the overall composite strength is proportionally reduced.

The use of carbon nanotubes has been proposed for numerous commercial applications, such as, for example, catalyst supports in heterogeneous catalysis, high strength engineering fibers, sensory devices and molecular wires for electronics devices. Accordingly, there has been an increasing demand for carbon nanotube structures that are free of impurities which often occur due to defects and variations in production, or growth rate. Additionally, although individual Carbon nanotubes have demonstrated useful properties when used as a filler in composite materials, those aggregate properties fall short of what would be expected. This is due in part to the presence of defects and variations, the tendency to bundle which prevents full or uniform dispersal in a composite, and the common interference/attractive effects between individual isolated nanotubes.

It would be advantageous to provide carbon nanotubes which overcome the above shortcomings.

SUMMARY

This disclosure relates to morphologically designed carbon nanotubes which are exposed to activated field electrodes. The disclosure also relates to a method of controlling morphology of carbon nanotubes by exposing the carbon nanotubes to activated varying spatially placed, sequential-time varying electrodes.

DETAILED DESCRIPTION

This disclosure relates to the morphological control of carbon nanotubes by the use of spatially sequential time varying field-directed synthesis of the carbon nanotubes. Carbon nanotubes (CNTs) may be designed or synthesized in a variety of morphologies, including coiled, hooked, spiraled, helical, geometric and irregular forms. These forms may be employed in a myriad of various applications, including, for example, micro electromechanical systems (MEMS) and advanced microelectronic interconnects.

Carbon nanotubes may be produced by any conventional method, including that disclosed by U.S. patent application Ser. No. 11/144,954 incorporated herein in its entirety. Carbon nanotubes typically designed or synthesized by conventional methods form into a variety of morphologies simultaneously and are difficult to separate into particular formations. Morphologies may, to some extent, be selected by control of synthesis conditions. Direct current plasma enhanced chemical vapor deposition (PECVD) and chemical vapor deposition (CVD) can be performed by techniques well known to those of ordinary skill in the art to produce CNTs, and align nanotubes along the electric field. The electric field along the edges of a substrate can have various orientations, which may cause CNTs grown in that area to also have differing orientations. The alignment is typically perpendicular to the surface on which the nanotubes are grown. CNTs can be formed or grown to include hooks on at least one end. However, these controls tend to be time-consuming and unreliable.

Carbon nanotubes may be designed or formed into programmed growth morphologies to produce a variety of CNT shapes and morphologies as desired via the use of spatially sequential time varying field-directed synthesis. The CNTs may be initially formed in an approximately straight shape by any conventional means. Hooks may then be formed on either one end or both ends of the straight CNTs by exposing the CNTs to an activated electric field or fields. Exposure to the electric fields can induce the CNTs to grow towards the negative charge of that field. In one embodiment, the orientation of the substrate with respect to the electric field may be varied or re-oriented to form and adapt CNT shapes. In an alternative embodiment, the electric field may be re-oriented with respect to the substrate on which the CNTs are grown to change or re-shape the carbon nanotubes. Yet another embodiment employs a fixed array of field-inducing electrodes, which can vary the electric fields sequentially in time and location to cause the CNTs to shift and change the direction of formation according to the location of the electric field. This sequentially varied field has the advantage of simplicity and control for implementing morphological changes.

Figure 1:
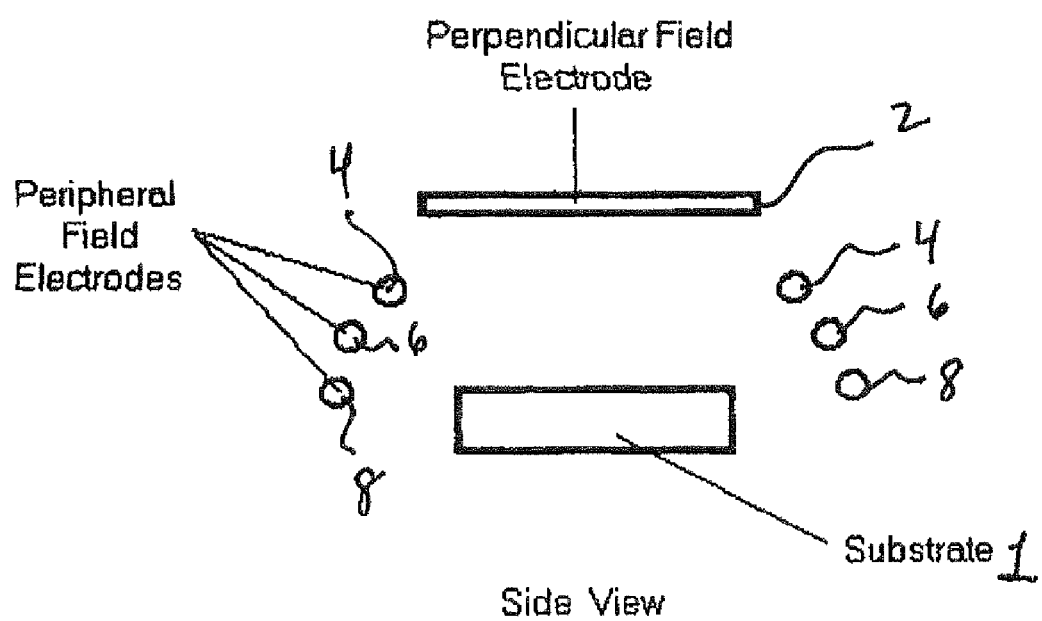
FIG. 1 is a diagrammatic depiction of the location of the perpendicular field electrodes and the peripheral field electrodes with respect to a substrate for CNT growth which may be used to form a an electrode array system to form hook-like structures on the ends of CNTs.

As shown in FIG. 1, a perpendicular field electrode 2 is located or placed at a short distance from a substrate 1 on which CNTs are grown. The distance range may be approximately several milliliters to several centimeters depending on the desired shape and size of the CNTs. The voltage ranges are approximately 100 volts to more than 1000 volts. Typically, more narrow distances will employ lower voltage.

This perpendicular field electrode 2 causes or can cause the CNTs to grow towards the negative charge of this electrode. This directional growth of the CNTs may be permitted for a period of time towards the perpendicular field electrode 2 for a period of time, causing the CNTs to grow in a generally straight pattern. The time frame is determined by the amount of desired growth and the rate of CNT growth. After a period of straight growth, the peripheral field electrodes are powered on. The uppermost peripheral field electrodes 4, which are uppermost with respect to the substrate 1, may be powered to produce a net growth field vector. This vector can cause the CNTs to curve towards the uppermost peripheral field electrodes 4. Another second sustained growth period of the CNTs may then be permitted where the CNTs grow towards this peripheral field electrode 4. Following this growth period, a second set of peripheral field electrodes 6 can be powered on, which induces further curvature within the growth field vector. Yet another third period of growth is permitted at the curvature or angle formed by the second set of electrodes 6. After this third growth period, a third, lower set of peripheral field electrodes 8 may be powered on. The third, lower set of peripheral field electrodes 8 are those located closest to the surface of the substrate as compared to the other peripheral field electrodes. This third set of peripheral field electrodes 8 may be employed in pairs above each terminus of the substrate. Alternatively, the peripheral field electrodes on a chosen terminus may be employed and powered on to form hooks-like ends on only one end of the CNTs.

The sequential activation and employment of the spatially separated peripheral field electrodes can induce the formation of a hook-like shape at the end of the CNTs. The size and/or diameter of the hook structure may be adjusted and controlled by the timing and field strength generated by the peripheral field electrodes as relative to the CNT growth rate.

Carbon nanotubes may also be advantageously formed in the shape of coils, helixes, springs and the like. A chemical vapor deposition ("CVD") approach has been previously employed to produce coiled CNTs. (See, for example, Jiao, J. et al., High-yield synthesis of carbon coils on tungsten substrates and their behavior in the presence of an electric field. J. Mater. Res., Vol. 18, No. 11, (2003)). However, these earlier processes would form a full spectrum of possible morphologies including different coil sizes, various pitches, different diameters, more than one chirality, and other shapes within a single synthesis of CNTs. Some control is available over these processes which may narrow the spectrum of morphologies somewhat, however a single shape can not be formed by these methods.

Figure 2:
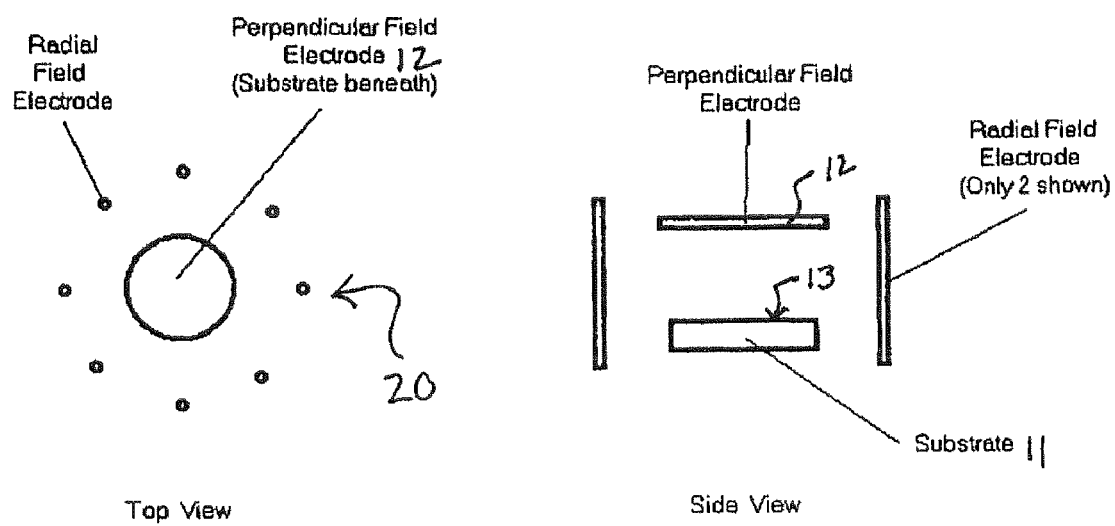
FIG. 2 is a diagrammatic depiction of the location of a circular electrode array which may surround a CNT growth substrate and be used to form coiled CNTs.
Figure 3:
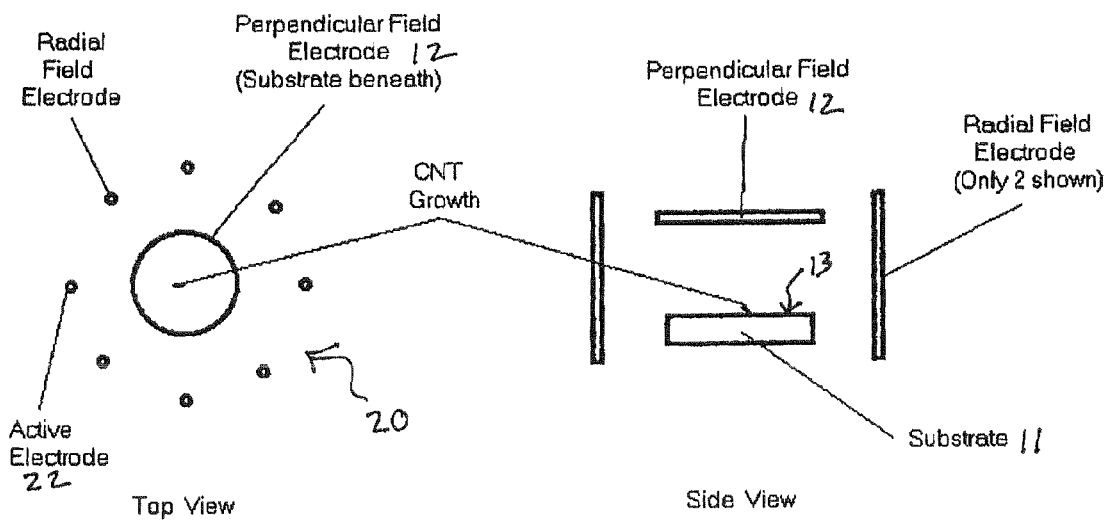
FIG. 3 a diagrammatic depiction of the electrode array which may be used to form field-directed synthesis of a CNT helix.
Figure 3:
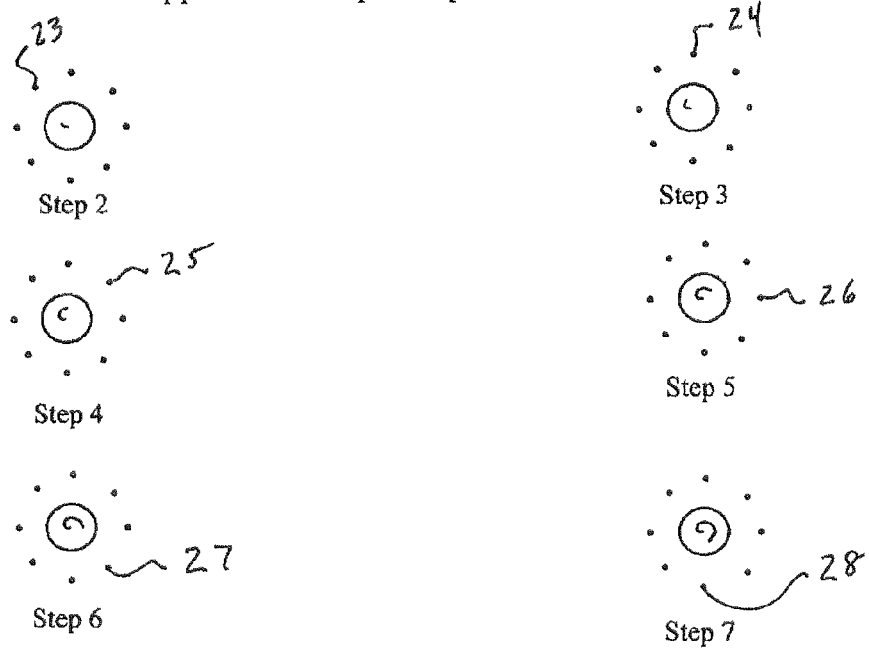

As shown in FIGS. 2 and 3, helically coiled CNTs may be formed using peripheral field electrodes in an approach similar to that employed, above, to form hook-like ends on CNTs. CNTs may be grown on a circular disc-shaped substrate 11 to form CNTs perpendicularly from the substrates flat surface 13. An electrode disc 12 of a similar shape may be placed a short distance above the substrate surface to provide an electric field. This electric field can enhance the straight CNT growth in a direction perpendicular to the substrate surface 13. The disc forming the substrate surface may be surrounded by a circular array of electrodes 20 around its perimeter. A radial bias field is developed when voltage is applied to one of the electrodes 22 in the circular peripheral array. The bias field develops at a right angle to the perpendicular field formed by electrode disc 12 above the substrate surface. These two fields combine to produce a growth vector field having direction, and the angle of the growth vector field is dependent on the relative field strengths of the both the perpendicular field and the radial bias field. As a result of these fields and their effects on the CNTs, the CNTs can be initially grown at an angle which is not perpendicular to the substrate surface 13. These fields may also be modified and adjusted to change the angle and direction of the CNTs growth.

The nanotube, or nanotubes, are permitted to have a growth period at that non-perpendicular angle. After that period of CNT growth, the next consecutive, peripheral electrode 23 is activated by applying voltage to it. The shifting of the activated electrode around the circular array causes subsequent CNT growth at a second different angle as compared to the initial non-perpendicular growth. Further CNT growth is permitted at this second angle for a period of time, after which time a third consecutive electrode 24 is activated. This third activated electrode 24 causes the CNT growth to shift and rotate, and yet another period of growth is permitted at that angle. The steps of activating one of the electrodes in the circular array and allowing the CNT to grow for some time period that permits the production of a length of CNT are repeated, as desired to produce any length CNT, so as to form a coil over multiple repetitions of the steps. Typically, electrodes may be activated in a consecutive fashion around the circular peripheral array, e.g., electrodes 25, 26, 27 and 28. The height of the perpendicular field electrode above the CNT substrate may be varied as the CNT continues to grow.

The dimensions of the CNTs may be controlled as desired by varying the electrode activation. The diameter of a coil may be determined by the relative field strengths employed by both the perpendicular and radial field electrode components, as activation is shifted about the circular array. The pitch of a coil may be determined by the electrode sequencing rate relative to the CNT growth rate. The chirality can be controlled by the radial field sequencing direction, i.e. the chirality can form in the activation direction of the electrodes. Patterned growth can be controlled by using a catalyst on desired growth sites to promote CNT growth at that particular location or locations. Acceptable catalysts may include, for example, cobalt, nickel, iron, molybdenum and combinations thereof. Alternatively, the electrode array may be activated in differing time sequences to vary the coil sizes and shapes as desired.

A wide range of morphologies may also be formed by controlling the sequencing of the electrode activations. In addition to, or separate from the sequence controls, various morphologies may be formed by modifying the field strength of the radial and/or perpendicular electric fields. These morphologies include non-circular coils which may be, for example, square, elliptical, or rectangular; coils of varying pitch or pitches, coils of varying diameter, for example beehive or pyramidal shapes; coils of reversing chirality; and the like.

Where the formation of relatively large diameter coils is desired, the catalyst may be located at sufficiently spaced points to "seed" the large coils and prevent the coil growth patterns from overlapping.

Where the substrate is formed into a relatively large diameter, the circumferential electrodes may be placed so that their distance from the substrate is large as compared to the diameter of the substrate. This arrangement insures that the CNTs may be exposed to approximately the same net growth field vector throughout the overall substrate.

It will be appreciated that CNTs of different morphologies may be employed in a myriad of ways. For example, CNT having hooks or hook-like structures on their ends may be used as a strong, effective VELCRO-like(hook and loop) structure with nano-structures that is not abrasive to surrounding materials. CNT coils can be used as nano-springs and in some cases, micro-springs for use in any environment that requires resistance to high temperatures or corrosiveness. CNT coils can also be highly useful in micro electromechanical systems (MEMS) and advanced microelectronic interconnects due to their ideal combination of high strength and minute size. CNTs of any shape may be advantageously in micro fabrications of those and many additional systems, such as for example, high frequency circuitry, accelerometers, and research equipment such as scanning tunnel microscopes and polymerase chain reaction microsystems.

It should be understood that the foregoing description is only illustrative of the invention. Various alternatives and modifications may be devised by those skilled in the art without departing from the spirit and scope of the invention. Accordingly, the present invention is intended to embrace all such alternatives, modifications and variances which fall within the scope of the appended claims.

What is claimed is:

1. A method of controlling morphology of carbon nanotubes, the method comprising:
   providing a substrate for growing at least one carbon nanotube;
   locating a perpendicular field electrode at predetermined distance away from the substrate defining a field space between the substrate and the perpendicular field electrode;
   arranging a plurality of peripheral field electrodes in pairs so that the peripheral field electrodes in each pair are at opposite respective ends of the field space and so that the pairs are disposed at successively greater distances from the perpendicular field electrodes;
   activating the perpendicular field electrode for a first predetermined period of time for growing the at least one carbon nanotube in a direction perpendicular to the substrate; and
   sequentially activating each pair of peripheral field electrodes from an uppermost pair to a lower most pair for a second predetermined period of time to from a curved hook on an end of the at least one carbon nanotube opposite the substrate.

2. A method of controlling morphology of carbon nanotubes of claim 1, further comprising causing carbon nanotube growth towards the activated electrodes.

3. A method of controlling morphology of carbon nanotubes, the method comprising:
   providing a substrate for growing at least one carbon nanotube;
   locating a perpendicular field electrode at predetermined distance away from the substrate defining a field space between the substrate and the perpendicular field electrode;
   arranging a circular array of electrodes around the periphery of the field space, where each electrode is arranged longitudinally from the perpendicular field electrode to the substrate;
   activating the perpendicular field electrode for growing the at least one carbon nanotube in a perpendicular direction from the substrate to the perpendicular field electrode; and
   sequentially activating each electrode of the circular array to cause subsequent growth of the at least one carbon nanotube at an angle different than the perpendicular growth.

4. The method of claim 3, further comprising causing carbon nanotube growth towards the activated electrodes.

5. The method of claim 4, further comprising forming carbon nanotube springs.

6. The method of claim 4, further comprising forming carbon nanotube coils.

7. The method of claim 4, further comprising forming carbon nanotube hooks.

8. The method of claim 3, further comprising repeating the sequential activation step to cause the subsequent growth of the at least one carbon nanotube to form into a coil shape.

9. The method of claim 8, wherein the diameter of the coil shape is controlled by varying the electric field strengths employed by the perpendicular field electrode and each electrode of the circular array .

10. The method of claim 8, wherein the pitch of the coil shape is controlled by varying the sequential activation rate relative to the growth rate of the at least one carbon nanotube.

* * * * *